United States Patent
Littmann et al.

(10) Patent No.: US 9,758,603 B2
(45) Date of Patent: *Sep. 12, 2017

(54) HIGH-PRESSURE POLYMERIZATION PROCESS OF ETHYLENICALLY UNSATURATED MONOMERS IN A TUBULAR REACTOR

(71) Applicant: Basell Polyolefine GmbH, Wesseling (DE)

(72) Inventors: Dieter Littmann, Mücke (DE); Jürgen Peter Mohrbutter, Alfter (DE); Giulia Mei, Ferrara (IT); Andre-Armand Finette, Köln (DE); Sven Georg Wolfram, Euskirchen (DE); Michael Deuerling, Weilerswist (DE); Danir Khayrullin, Brühl (DE); Georg Groos, Dannstadt-Schauernheim (DE); Christoph Wolf, Pulheim-Dansweiler (DE)

(73) Assignee: Basell Polyolefine GmbH, Wesseling (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/461,064

(22) Filed: Mar. 16, 2017

(65) Prior Publication Data

US 2017/0183429 A1   Jun. 29, 2017

Related U.S. Application Data

(63) Continuation of application No. 15/240,084, filed on Aug. 18, 2016, now Pat. No. 9,631,037, which is a (Continued)

(30) Foreign Application Priority Data

Jul. 23, 2015 (EP) .................................. 15178042

(51) Int. Cl.
*C08F 110/02* (2006.01)
*C08F 2/01* (2006.01)
(Continued)

(52) U.S. Cl.
CPC ......... *C08F 110/02* (2013.01); *B01J 19/2415* (2013.01); *C08J 5/18* (2013.01); *C08J 2323/06* (2013.01)

(58) Field of Classification Search
CPC ............ C08F 2/01; C08F 2/34; B01J 19/2415
(Continued)

(56) References Cited

U.S. PATENT DOCUMENTS 3,809,688 A   5/1974   Clementi et al.
4,175,169 A   11/1979  Beals et al.
(Continued)

FOREIGN PATENT DOCUMENTS

EP   2636691 A1   9/2013

OTHER PUBLICATIONS

European Search Report dated Jan. 25, 2016 for EP Application No. 15178042.6.

*Primary Examiner* — Fred M Teskin

(57) ABSTRACT

The present technology relates to a process for polymerizing or copolymerizing ethylenically unsaturated monomers in the presence of free-radical polymerization initiators, wherein the polymerization is carried out in a continuously operated tubular reactor at temperatures from 100° C. to 350° C. and pressures from 180 MPa to 340 MPa, with a specific reactor surface area $A_{sp}$ of 2 m²/(t/h) to 5.5 m²/(t/h), and the tubular reactor has a specific ratio $RD_{sp}$ of 0.0050 MPa$^{-1}$ to 0.0069 MPa$^{-1}$ and an inner surface which has a surface roughness Ra of 2 μm or less.

18 Claims, 2 Drawing Sheets

Related U.S. Application Data continuation of application No. 15/044,855, filed on Feb. 16, 2016, now Pat. No. 9,441,057.

(51) Int. Cl.
  *C08J 5/18* (2006.01)
  *B01J 19/24* (2006.01)
  *C08F 2/34* (2006.01)
  *C08F 2/38* (2006.01)

(58) Field of Classification Search
  USPC .................................. 526/64, 918; 422/134
  See application file for complete search history.

(56) References Cited

U.S. PATENT DOCUMENTS

| | | | | |
|---|---|---|---|---|
| 4,788,265 A | * | 11/1988 | Pfleger | C08F 210/02 526/318.45 |
| 6,844,408 B2 | * | 1/2005 | Gonioukh | C08F 10/02 526/228 |
| 7,820,776 B2 | | 10/2010 | Neuteboom et al. | |
| 8,273,835 B2 | * | 9/2012 | Littmann | B01J 4/008 422/134 |
| 9,441,057 B1 | * | 9/2016 | Littmann | C08F 110/02 |
| 2007/0032614 A1 | | 2/2007 | Goossens et al. | |
| 2015/0133616 A1 | | 5/2015 | Sultan et al. | |
| 2017/0022303 A1 | * | 1/2017 | Littmann | C08F 110/02 |

* cited by examiner

HIGH-PRESSURE POLYMERIZATION PROCESS OF ETHYLENICALLY UNSATURATED MONOMERS IN A TUBULAR REACTOR

CROSS-REFERENCE TO RELATED APPLICATIONS

This application is a Continuation application of co-pending U.S. patent application Ser. No. 15/240,084, filed Aug. 18, 2016, which is a Continuation application of U.S. patent application Ser. No. 15/044,855, filed Feb. 16, 2016, now U.S. Pat. No. 9,441,057, issued Sep. 13, 2016, which claims the benefit of priority to European Patent Application No. 15178042.6 filed on Jul. 23, 2015, which is incorporated herein by reference in its entirety.

FIELD OF THE INVENTION

The present disclosure provides a process for polymerizing or copolymerizing ethylenically unsaturated monomers in the presence of free-radical polymerization initiators at temperatures from 100° C. to 350° C. and pressures from 180 MPa to 340 MPa in a continuously operated tubular reactor.

BACKGROUND OF THE INVENTION

Polyethylene is the most widely used commercial polymer and can be prepared by different processes. Polymerization in the presence of free-radical initiators at elevated pressures was the method first discovered to obtain polyethylene and continues to be of commercial relevance for the preparation of low density polyethylene (LDPE).

A common set-up of a plant for preparing low density polyethylene comprises a polymerization reactor and reaction components that may be pressurized by a combination of two compressors, a primary compressor and a secondary compressor. At the end of the polymerization sequence, a high-pressure polymerization unit may further include apparatuses like extruders and granulators for pelletizing the resulting polymer. Furthermore, such a polymerization unit generally may also comprise means for feeding monomers and comonomers, free-radical initiators, chain transfer agents and/or other substances at one or more positions into the polymerization reaction. A process and an apparatus for the manufacture of ethylene polymers and copolymers under high pressures are disclosed in WO 2007/018871 A1.

A characteristic of the radically initiated polymerization of ethylenically unsaturated monomers under high pressure is that the conversion of the monomers is often incomplete, as only about 10% to 50% of the dosed monomers are converted. The resulting reaction mixture may leave the reactor through a pressure control valve, often designated as a let-down valve, and may then be separated into polymeric and gaseous components with the unreacted monomers being recycled. To avoid unnecessary decompression and compression steps, the separation into polymeric and gaseous components is usually carried out in two stages. The monomer-polymer mixture leaving the reactor is transferred to a first separating vessel, frequently called a high-pressure product separator, in which the separation into polymeric and gaseous components is carried out at a pressure that allows recycling of the ethylene and comonomers separated from the monomer-polymer mixture to the reaction mixture at a position between the primary compressor and the secondary compressor. At the first separation vessel operating conditions, the polymeric components within the separating vessel are in liquid state. The liquid phase obtained in the first separating vessel is transferred to a second separation vessel, frequently called a low-pressure product separator, in which further separation into polymeric and gaseous components takes place at lower pressure. The ethylene and comonomers separated from the mixture in the second separation vessel are fed to the primary compressor where they are compressed to the pressure of the fresh ethylene feed, combined with the fresh ethylene feed and the joined streams are further pressurized to the pressure of the high-pressure gas recycle stream.

The recycling of unreacted monomers to the inlet of the reactor and conducting the recycle at high pressures, which may reduce the need for re-compressing, are measures that may improve the economics of high-pressure polymerization processes. Nonetheless, carrying out the recycling requires considerable efforts commensurate with the amount of monomer converted to polymer per pass of the reactor. Consequently, there is a demand for conducting high-pressure polymerizations for maximizing the conversion of monomers per pass of the reactor to produce the targeted low density polyethylene grades. However, the possibilities for influencing the conversion of monomers by changing polymerization conditions are limited since the properties and the structure of the resulting ethylene homopolymers or copolymers, such as molecular weight, molecular weight distribution and the amount of short- and long-chain branching, depend strongly on the reaction parameters.

Furthermore, various articles and applications of low density polyethylenes such as blown films often require a narrow molecular weight distribution of the low density polyethylene for achieving a good balance of optical and mechanical properties. Accordingly, there is a demand for low density polyethylenes with narrow molecular weight distributions in a high-pressure polymerization process.

Hence, there is a need to overcome the disadvantages of the prior art and to provide a process which makes it possible to polymerize or copolymerize ethylenically unsaturated monomers in a tubular reactor with a high conversion of monomers to polymer per pass of the reactor. Furthermore, the process should allow for the preparation of low density polyethylenes with a high conversion rate per pass of the reactor without introducing detrimental effects in the article forming processes or on properties of the produced low density polyethylenes.

SUMMARY OF THE INVENTION

The present disclosure provides for a process for polymerizing or copolymerizing ethylenically unsaturated monomers in the presence of free-radical polymerization initiators, wherein the polymerization is carried out at temperatures from 100° C. to 350° C. and pressures in the range from 180 MPa to 340 MPa in a continuously operated tubular reactor, wherein the reaction gas composition is brought to the polymerization pressure by a combination of a primary compressor and a secondary compressor and the compressed reaction gas composition is fed to the inlet of the tubular reactor or the reaction gas composition is split in a main stream, which is fed to the inlet of the tubular reactor, and one or more side streams, which are fed to the tubular reactor downstream of the inlet of the tubular reactor, and wherein the polymerization is conducted with a specific reactor surface area $A_{sp}$ of 2 m²/(t/h) to 5.5 m²/(t/h), the specific reactor surface area $A_{sp}$ being the ratio of the area of the inner surface of the tubular polymerization reactor to the feed rate of reaction gas composition to the tubular reactor, and wherein the tubular reactor has a specific ratio $RD_{sp}$ of from 0.0050 $MPa^{-1}$ to 0.0069 $MPa^{-1}$, $RD_{sp}$ being the ratio of the outer diameter $d_o$ to the inner diameter $d_i$ divided by the design pressure $p_{des}$ according to equation $$RD_{sp} = \frac{d_o}{d_i * p_{des}},$$

and the tubular reactor has an inner surface which has a surface roughness Ra of 2 μm or less, determined according to DIN EN ISO 4287:2010.

In some embodiments, the tubular reactor has an inner diameter $d_i$ of from 50 to 120 mm.

In some embodiments, the design pressure $p_{des}$ of the tubular reactor is from 240 MPa to 400 MPa.

In some embodiments, the feed rate of the reaction gas composition to the tubular reactor is 80 t/h to 210 t/h.

In some embodiments, the tubular reactor is composed of tubes of a length of 5 m to 25 m.

In some embodiments, the entire reaction gas composition provided by the secondary compressor is fed to the inlet of the tubular reactor.

In some embodiments, 30-90% by weight of the reaction gas composition provided by the secondary compressor is fed to the inlet of the tubular reactor and 10-70% by weight of the reaction gas composition provided by the secondary compressor is fed as one or more side streams to the tubular reactor downstream of the inlet of the tubular reactor.

In some embodiments, the polymerization is carried out in the presence of a chain transfer agent.

In some embodiments, the chain transfer agent comprises at least one aldehyde or at least one ketone.

In some embodiments, the amount of added aldehydes and ketones is from 0.4 kg/t of prepared polymer to 10 kg/t of prepared polymer.

In some embodiments, propionic aldehyde is used as the sole chain transfer agent or the chain transfer agent is a mixture of propionic aldehyde and one or more olefinic hydrocarbons.

In some embodiments, the present disclosure provides a process for preparing a shaped article, wherein a polymer prepared by a process as described above is converted into the shaped article.

In some embodiments, the shaped article is a film.

DETAILED DESCRIPTION OF THE INVENTION

Figure 1:
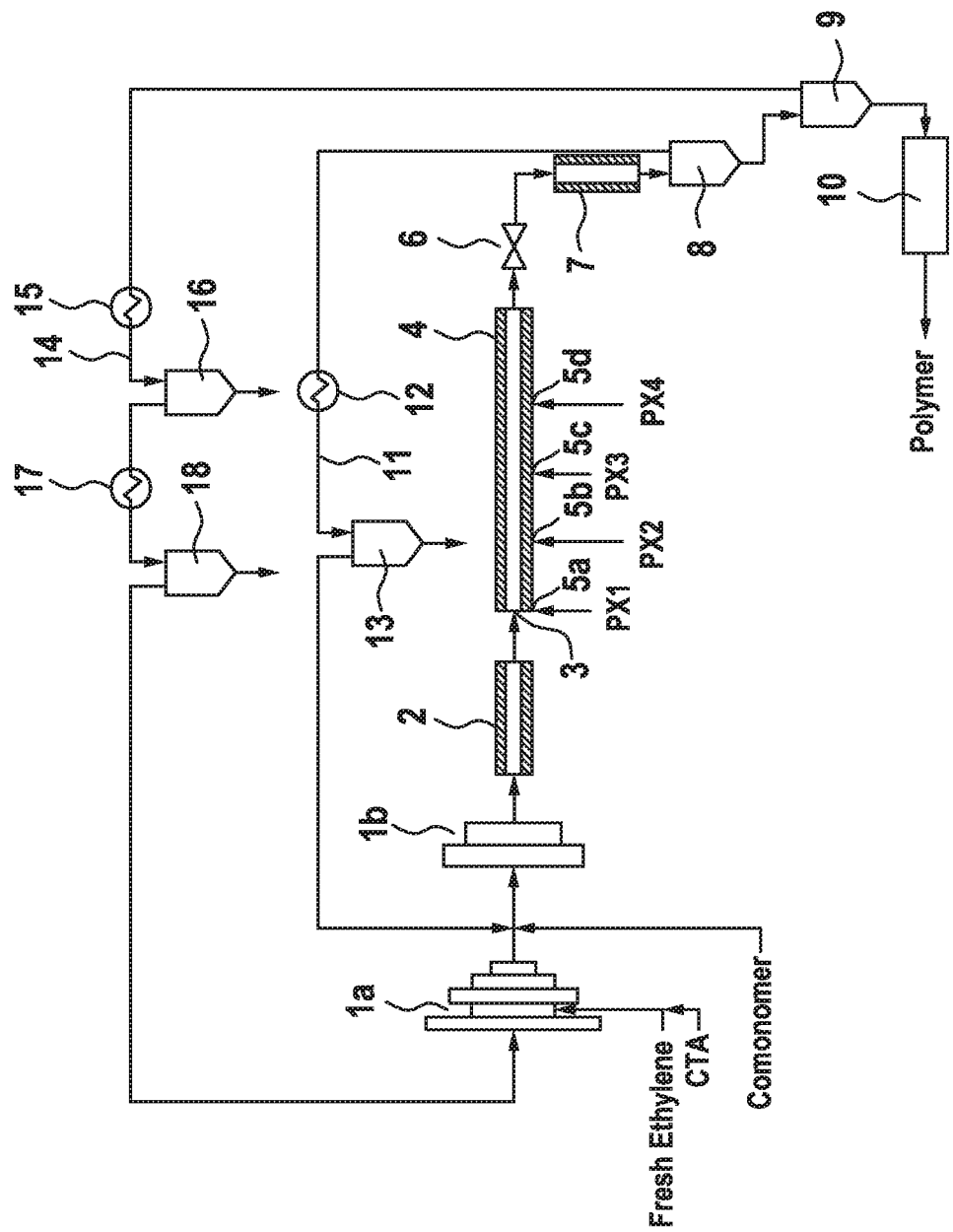
FIG. 1 shows schematically a set-up for a polymerization reactor in which the entire reaction gas composition compressed by the secondary compressor is fed as one stream to the inlet of the tubular reactor.

The present disclosure refers to a process for polymerizing or copolymerizing ethylenically unsaturated monomers in the presence of free-radical polymerization initiators in a continuously operated tubular reactor at temperatures from 100° C. to 350° C. and pressures from 180 MPa to 340 MP. The present disclosure describes a process which gives a high conversion of monomers to polymer per pass of the reactor.

The high-pressure polymerization may be a homopolymerization of ethylene or a copolymerization of ethylene with one or more other monomers, provided that these monomers are free-radically copolymerizable with ethylene under high pressure. Examples of suitable copolymerizable monomers are α,β-unsaturated $C_3$-$C_8$-carboxylic acids, in particular maleic acid, fumaric acid, itaconic acid, acrylic acid, methacrylic acid and crotonic acid, derivatives of α,β-unsaturated $C_3$-$C_8$-carboxylic acids, e.g. unsaturated $C_3$-$C_{15}$-carboxylic esters including esters of $C_1$-$C_6$-alkanols, or anhydrides such as methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and 1-olefins such as propene, 1-butene, 1-pentene, 1-hexene, 1-octene or 1-decene. In addition, vinyl carboxylates such as vinyl acetate can be used as comonomers.

In the case of copolymerization, the proportion of comonomer or comonomers in the reaction mixture is from 1 to 50% by weight, such as from 3 to 40% by weight, based on the amount of monomers, i.e. the sum of ethylene and other monomers. Depending on the type of comonomer, the comonomers may be fed at more than one point into the reactor set-up. For instance, the comonomers may be fed to the suction side of the secondary compressor.

For the purposes of the present disclosure, polymers or polymeric materials are all substances which are made up of at least two monomer units. The polymers or polymeric materials are preferably low density polyethylenes having an average molecular weight $M_n$ of more than 20 000 g/mole. The term low density polyethylene is meant to include ethylene homopolymers and ethylene copolymers. The present disclosure can also be advantageously employed in the preparation of oligomers, waxes and polymers having a molecular weight $M_n$ of less than 20 000 g/mole.

Possible initiators for starting the free-radical polymerization in the respective reaction zones are all substances that can produce radical species under the conditions in the polymerization reactor, for example, oxygen, air, azo compounds or peroxidic polymerization initiators. In some embodiments of the disclosure the polymerizations are carried out by using oxygen, either fed in the form of pure $O_2$ or as air. In such cases, the initiator may first be mixed with the ethylene feed and then fed to the reactor such that it is not only possible to feed a stream comprising monomer and oxygen to the beginning of the polymerization reactor but also to one or more points along the reactor, thereby creating two or more reaction zones. Initiation using organic peroxides or azo compounds also represents embodiments of the present disclosure. Examples of suitable organic peroxides are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-sec-butyl peroxydicarbonate, di-tert-butyl peroxide, di-tert-amyl peroxide, dicumyl peroxide, 2,5-dimethyl-2,5-di-tertbutylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2- ethylhexanoylperoxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)cyclohexane, tert-butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxybenzoate, methyl isobutyl ketone hydroperoxide, 3,6,9-triethyl-3,6,9-trimethyl-triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, are also suitable. It is possible to use either individual initiators or mixtures of various initiators. A large range of initiators, such as peroxides, are commercially available, for example the products of Akzo Nobel offered under the trade names Trigonox® or Perkadox®.

Peroxidic polymerization initiators for use in the present technology include, for example, 1,1-di(tert-butylperoxy)cyclohexane, 2,2-di(tert-butylperoxy)butane, tert-butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne, and particular preference is given to using tert-butyl peroxy-3,5,5-trimethylhexanoate, di-(2-ethylhexyl)peroxydicarbonate or tert-butyl peroxy-2-ethylhexanoate.

The initiators can be employed individually or as a mixture in concentrations of 0.1 mol/t to 50 mol/t of polyethylene produced, including from 0.2 mol/t to 20 mol/t, in each reaction zone. In some embodiments the free-radical polymerization initiator, which is fed to a reaction zone, is a mixture of at least two different azo compounds or organic peroxides. If such initiator mixtures are used they may be fed to all reaction zones. There is no limit to the number of different initiators in such a mixture. In some embodiments the mixtures are composed of from two to six different initiators, such as two, three or four different initiators. In certain embodiments, the mixtures may comprise initiators which have different decomposition temperatures.

It can be beneficial in some embodiments to use the initiators in a dissolved state. Examples of suitable solvents are ketones and aliphatic hydrocarbons, in particular octane, decane and isododecane and also other saturated $C_8$-$C_{25}$-hydrocarbons. The solutions comprise the initiators or initiator mixtures in proportions of 2 to 65% by weight, including 5 to 40% by weight and 8 to 30% by weight.

In one embodiment of the present disclosure, the polymerization is carried out in the presence of a chain transfer agent. Chain transfer agents are chemical compounds which may interact with a growing polymer chain, terminate the further growth of the growing polymer chain and induce the growth of another growing chain. Accordingly, the molecular weight of the polymers to be prepared can be altered by the addition of chain transfer agents which are also called modifiers or regulators. Examples of suitable chain transfer agents are hydrogen, aliphatic and olefinic hydrocarbons, e.g. propane, butane, pentane, hexane, cyclohexane, propene, 1-butene, 1-pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol or mixtures of these compounds. The amount of chain transfer agent fed to the tubular reactor is, in certain embodiments, from 0.2 kg/t prepared polymer to 40 kg/t prepared polymer, such as 0.4 kg/t prepared polymer to 20 kg/t prepared polymer. In one embodiment a chain transfer agent comprising at least one aldehyde or at least one ketone is employed and the amount of added aldehydes and ketones is from 0.4 kg/t of prepared polymer to 10 kg/t of prepared polymer.

In a further embodiment of the present disclosure, propionic aldehyde is used as sole chain transfer agent or the chain transfer agent is a mixture of propionic aldehyde and one or more olefinic hydrocarbons.

The high-pressure polymerization is carried out at pressures in a range from 180 MPa to 340 MPa, for instance at pressures of 200 MPa to 320 MPa. The polymerization temperatures are, in some embodiments, in a range from 100° C. to 350° C., including from 120° C. to 340° C. and from 150° C. to 330° C.

The compression of the reaction gas composition to the polymerization pressure is carried out by a combination of a primary compressor and a secondary compressor in which the primary compressor, in certain embodiments, first compresses the reaction gas composition to a pressure of 10 MPa to 50 MPa and the secondary compressor further compresses the reaction gas composition to the polymerization pressure of 180 MPa to 340 MPa. In some embodiments, the primary compressor and the secondary compressor are multistage compressors. It is further possible to separate one or more stages of one or both of the compressors and divide the stages into separated compressors. However, a series of one primary compressor and one secondary compressor may be used for compressing the reaction gas composition to the polymerization pressure. In such cases, the whole primary compressor may be designated as the primary compressor. However, one or more first stages of the primary compressor, which compress the recycle gas from the low-pressure product separator to the pressure of the fresh ethylene feed, may be designated as the booster compressor and the one or more subsequent stages may be designated as the primary compressor, although the booster compressor and the subsequent stages may comprise a single apparatus. A secondary compressor may be referred to as a hyper compressor. In some embodiments, the capacity of the secondary compressor, defined as the feed rate of compressed reaction gas composition from the compressor combination to the tubular reactor, is from 80 t/h to 210 t/h, including from 100 t/h to 180 t/h and from 120 t/h to 160 t/h.

In one embodiment of the present disclosure, the entire reaction gas composition provided by the secondary compressor is fed to the inlet of the tubular reactor. In another embodiment, only a part of the reaction gas composition compressed by the secondary compressor is fed to the inlet of the tubular reactor and the remainder of the reaction gas composition compressed by the secondary compressor is fed as one or more side streams to the tubular reactor downstream of the inlet of the tubular reactor. In such a set-up, 30 to 90% by weight, including 40 to 70% by weight, of the reaction gas composition provided by the secondary compressor is fed to the inlet of the tubular reactor and 10 to 70% by weight, such as 30 to 60% by weight, of the reaction gas composition provided by the secondary compressor is fed as one or more side streams to the tubular reactor downstream of the inlet of the tubular reactor.

The process of the present disclosure may be conducted in a tubular reactor comprising a specific reactor surface area $A_{sp}$ of the tubular reactor, e.g. the ratio of the area of the inner surface of the tubular polymerization reactor to the feed rate of reaction gas composition fed from the compressor combination to the tubular reactor, is 2 m²/(t/h) to 5.5 m²/(t/h), such as 3 m²/(t/h) to 5 m²/(t/h), and 3.5 m²/(t/h) to 4.5 m²/(t/h). In certain embodiments where the polymerization is carried out in a manner such that a part of the reaction gas composition is fed as one or more side streams to a downstream part of the tubular reactor, the feed rate for calculating the specific reactor surface area $A_{sp}$ is the combination of the feed rate of the reaction gas composition fed to the inlet of the tubular reactor and the feed rates of the side streams.

Tubular reactors for use in the present technology may be long, thick-walled pipes from about 0.5 km to 5 km in length, such as from 1 km to 4 km and from 1.5 km to 3 km. The inner diameter $d_i$ of the tubular reactor may be from 50 mm to 120 mm, including from 60 mm to 100 mm. In case the tubular reactor is designed to be operated with one or more reaction gas side streams, the farthest downstream part of the tubular reactor, which is passed by the total reaction mixture, may comprise an inner diameter $d_i$ in the range from 50 mm to 120 mm, such as from 60 mm to 100 mm. Suitable tubular reactors may have a length-to-diameter ratio of greater than 1000, including from 10000 to 50000 and from 20000 to 35000. In certain embodiments, the tubular reactor is composed of tubes of a length from 5 m to 25 m, such as from 10 m to 22 m and from 15 m to 20 m. The individual tubes of the tubular reactor may be flanged together. The tube can also be flanged to a bend, for instance to a 180° bend. Such 180° bends may have a relatively small radius, i.e. a ratio $R/d_o$ of 4 or less, with R being the radius of curvature of the bending and $d_o$ being the outer diameter of the tube, for the purpose of saving space.

The tubular reactor employed in the process of the present disclosure is characterized in that the specific ratio $RD_{sp}$, which is the ratio of the outer diameter $d_o$ to the inner diameter $d_i$ divided by the design pressure $p_{des}$ according to equation $$RD_{sp} = \frac{d_o}{d_i * p_{des}},$$

is in the range from 0.0050 MPa$^{-1}$ to 0.0069 MPa$^{-1}$. In certain embodiments, the specific ratio $RD_{sp}$ is in the range from 0.0053 MPa$^{-1}$ to 0.0066 MPa$^{-1}$, such as from 0.0056 MPa$^{-1}$ to 0.0063 MPa$^{-1}$. In case the tubular reactor is operated in a manner that the total amount of reaction gas composition is fed to the inlet of the tubular reactor, in some embodiments the tubular reactor has the same inner and outer diameters over the total length of the tubular reactor, although in the region of a bend the outer diameter may be larger than that of the straight tubes for compensating for an uneven wall thickness distribution caused by the bending process. In case the polymerization is carried out in a manner that only a part of the reaction gas composition is fed to the inlet of the tubular reactor and the remainder of the reaction gas composition is fed as one or more side streams to a downstream part of the tubular reactor, it is possible that the tubular reactor has the same inner and outer diameters over the total length of the tubular reactor. For operating the tubular reactor with reaction gas side streams, in certain embodiments the inner diameter $d_i$ increases downstream of the feeding points of the side streams. In such a case the process of the present disclosure may be carried out in a tubular reactor of which at least the most downstream part of the reactor has a specific ratio $RD_{sp}$ in the range from 0.0050 MPa$^{-1}$ to 0.0069 MPa$^{-1}$, including from 0.0053 MPa$^{-1}$ to 0.0066 MPa$^{-1}$ and from 0.0056 MPa$^{-1}$ to 0.0063 MPa$^{-1}$, where all parts of the reactor have a specific ratio $RD_{sp}$ in the range from 0.0050 MPa$^{-1}$ to 0.0069 MPa$^{-1}$, such as from 0.0053 MPa$^{-1}$ to 0.0066 MPa$^{-1}$ and from 0.0056 MPa$^{-1}$ to 0.0063 MPa$^{-1}$, although the inner and outer diameters may increase from the inlet to the outlet of the tubular reactor.

The specific ratio $RD_{sp}$ is a measure for the ratio of the outer diameter $d_o$ to the inner diameter $d_i$, referenced to the design pressure $p_{des}$, such that a decreasing ratio results in a thinning of the reactor walls for a given design pressure $p_{des}$. Conversely, because higher design pressures require higher wall strengths, constructing a tubular reactor for a higher design pressure $p_{des}$ with an identical specific ratio $RD_{sp}$ results in the construction of a tubular reactor with an increasing ratio $d_o$ to $d_i$ or, if the inner diameter $d_i$ is kept constant, with a larger outer diameter $d_o$. In certain embodiments, designing a tubular reactor with a specific ratio $RD_{sp}$ as defined in the present disclosure results in relatively thin reactor walls and accordingly facilitates the heat transfer through the reactor wall.

The design pressure $p_{des}$ of a tubular reactor is the maximum pressure for which the reactor is designed for continuous usage. Tubular reactors for carrying out the process of the present disclosure have, in certain embodiments, a design pressure of 240 MPa to 400 MPa, including 260 MPa to 380 MPa and 280 MPa to 360 MPa.

For carrying out the polymerization according to the present disclosure, steel of a suitable composition and thermal profile should be utilized to carry out an adequate heat-treatment of the pre-formed bars from which the tubes are produced. Iron-based alloys and methods for preparing tube components from these alloys are disclosed in EP 1 529 853 A2. In one embodiment of the present disclosure, the final steel of which the tubular reactor consist has an tensile strength $R_m$, i.e. an ultimate tensile strength of at least 1100 N/mm², including at least 1150 N/mm² and at least 1200 N/mm², as determined according to EN ISO 6892-1:2009. In further embodiments, the steel has a 0.2% tensile yield strength of at least 1000 N/mm², such as at least 1100 N/mm² determined according to EN ISO 6892-1:2009, and a 0.2% tensile yield strength at 300° C. of at least 900 N/mm², more preferably at least 940 N/mm², determined according to EN ISO 6892-2:2011.

In certain embodiments, the tubular reactor employed in the present disclosure has an inner surface roughness (Ra) of 2 μm or less, such as 1 μm or less and 0.4 μm or less, determined according to DIN EN ISO 4287:2010, which is incorporated herein by reference. The low roughness may be achieved by grinding, polishing, lapping and/or honing of surface.

Conducting a polymerization or copolymerization of ethylenically unsaturated monomers according to the process of the present disclosure advantageously results in a higher conversion of monomers per pass of the reactor than carrying out such a polymerization under identical conditions in a tubular reactor of the same dimensions, but which does not fulfill the required conditions for the specific ratio $RD_{sp}$ and the roughness Ra of the inner surface. By increasing the conversion of monomers per pass of the reactor, the polymer output of the reactor rises. In some embodiments of the present disclosure, the polymer output is 2 to 5% higher than when carrying out such a polymerization under identical conditions in a tubular reactor of the same dimensions having a surface roughness (Ra) of more than 2 μm and a specific ratio $RD_{sp}$ of more than 0.0069 $MPa^{-1}$.

Commonly the polymerization apparatus comprises, besides the polymerization reactor and the combination of compressors, a high-pressure gas recycle line and a low-pressure gas recycle line for recycling unreacted monomers to the polymerization process. The reaction mixture obtained in the polymerization reactor is transferred to a first separation vessel, frequently called a high-pressure product separator, and separated into a gaseous fraction and a liquid fraction at a pressure of 15 MPa to 50 MPa. The gaseous fraction withdrawn from the first separation vessel is fed via the high-pressure gas recycle line to the suction side of the secondary compressor. In the high-pressure gas recycle line, the gas may be purified by several purifications steps for removing undesired components such as entrained polymer or oligomers. The liquid fraction withdrawn from the first separation vessel, which may comprise dissolved monomers such as ethylene and comonomers in an amount of 20 to 40% by weight, is transferred to a second separation vessel, frequently called low-pressure product separator, and further separated, at reduced pressure, at an absolute pressure in a range from 0.1 to 0.5 MPa, with respect to the polymeric and gaseous components. The gaseous fraction may be withdrawn from the second separation vessel and fed via a low-pressure gas recycle line to the primary compressor. The low-pressure gas recycle line may comprise several purifications steps for purifying the gas from the undesired components.

The recycled gas coming from the low-pressure gas recycle line may be compressed in the first stages of the primary compressor to the pressure of the fresh feed of ethylenically unsaturated monomers, such as ethylene, and combined with the fresh gas feed. In some embodiments, the combined gases are further compressed in the primary compressor to a pressure of 10 MPa to 50 MPa. In certain embodiments, the primary compressor comprises five or six compression stages, two or three before adding the fresh gas and two or three after adding the fresh gas. The secondary compressor may comprise two stages; a first stage, which compresses the gas from about 30 MPa to about 120 MPa, and a second stage, which further compresses the gas from about 120 MPa to the final polymerization pressure.

Tubular reactors for use in the present technology may have at least two reaction zones, such as from 2 to 6 reaction zones and from 2 to 5 reaction zones. The number of reaction zones is given by the number of feeding points for the initiators or initiator mixtures. Such a feeding point can, for example, be an injection point for a solution of azo compounds or organic peroxides. The initiator is added to the reactor and decomposes into free radicals, which initiate polymerization. The heat of the reaction increases the reaction mixture temperature and increases the rate of decomposition of the free-radical initiators and accelerates polymerization until essentially all of the free-radical initiator is consumed. The temperature then decreases since the temperature of the reactor walls is lower than that of the reaction mixture. Accordingly, the part of the tubular reactor downstream of an initiator feeding point in which the temperature rises is a reaction zone, while the part thereafter, in which the temperature decreases again, is predominantly a cooling zone. The amount and nature of added free-radical initiators determines how much the temperature rises. In some embodiments, the temperature rise is set to be in the range from 70° C. to 170° C. in the first reaction zone and 50° C. to 130° C. for the subsequent reaction zones, depending on the product specifications and the reactor configuration.

FIG. 1 shows schematically a set-up for a polymerization reactor in which the entire reaction gas composition compressed by the secondary compressor is fed as one stream to the inlet of the tubular reactor.

The fresh ethylene, which may be under a pressure of 1.7 MPa, is initially compressed to a pressure of about 30 MPa by means of a primary compressor (1a) and then compressed to the reaction pressure of about 300 MPa using a secondary compressor (1b). The chain transfer agent (CTA) is added to primary compressor (1a). The reaction mixture leaving the primary compressor (1b) is fed to pre-heater (2), where the reaction mixture is preheated to the reaction start temperature of from about 120° C. to 220° C., and then conveyed to the inlet (3) of the tubular reactor (4).

The tubular reactor (4) is a long, thick-walled pipe with cooling jackets to remove the liberated heat of reaction from the reaction mixture by means of a coolant circuit (not shown).

The tubular reactor (4) shown in FIG. 1 has four spatially separated initiator injection points (5a), (5b), (5c) and (5d) for feeding initiators or initiator mixtures PX1, PX2, PX3 and PX4 to the reactor comprising four reaction zones. By feeding suitable free-radical initiators, which decompose at the temperature of the reaction mixture, to the tubular reactor the polymerization reaction starts.

The reaction mixture leaves the tubular reactor (4) through a high-pressure let-down valve (6) and passes through a post reactor cooler (7). Thereafter, the resulting polymer is separated off from unreacted ethylene and other low molecular weight compounds (monomers, oligomers, polymers, additives, solvent, etc.) by means of a first separation vessel (8) and a second separation vessel (9), discharged and pelletized via an extruder and granulator (10).

The ethylene and comonomers which have been separated off in the first separation vessel (8) are fed back to the low-pressure side of the tubular reactor (4) in the high-pressure circuit (11) at 30 MPa. In the high-pressure circuit (11), the gaseous material separated from the reaction mixture is first freed from other constituents in at least one purification stage and then added to the monomer stream between primary compressor (1a) and secondary compressor (1b). FIG. 1 shows one purification stage consisting of a heat exchanger (12) and a separator (13). In some embodiments, a plurality of purification stages may be used. The high-pressure circuit (11) may be used to separate waxes.

The ethylene separated off in the second separation vessel (9) further comprises, inter alia, the majority of the low molecular weight products of the polymerization (oligomers) and the solvent, may be worked up in the low-pressure circuit (14) at an absolute pressure of about 0.1 to 0.5 MPa in a plurality of separators, with a heat exchanger being located between each of the separators. FIG. 1 shows two purification stages consisting of heat exchangers (15) and (17) and separators (16) and (18). It is possible to use only one purification stage or, alternatively, more than two purification stages. The low-pressure circuit (14) may be used to separate oil and waxes.

Figure 2:
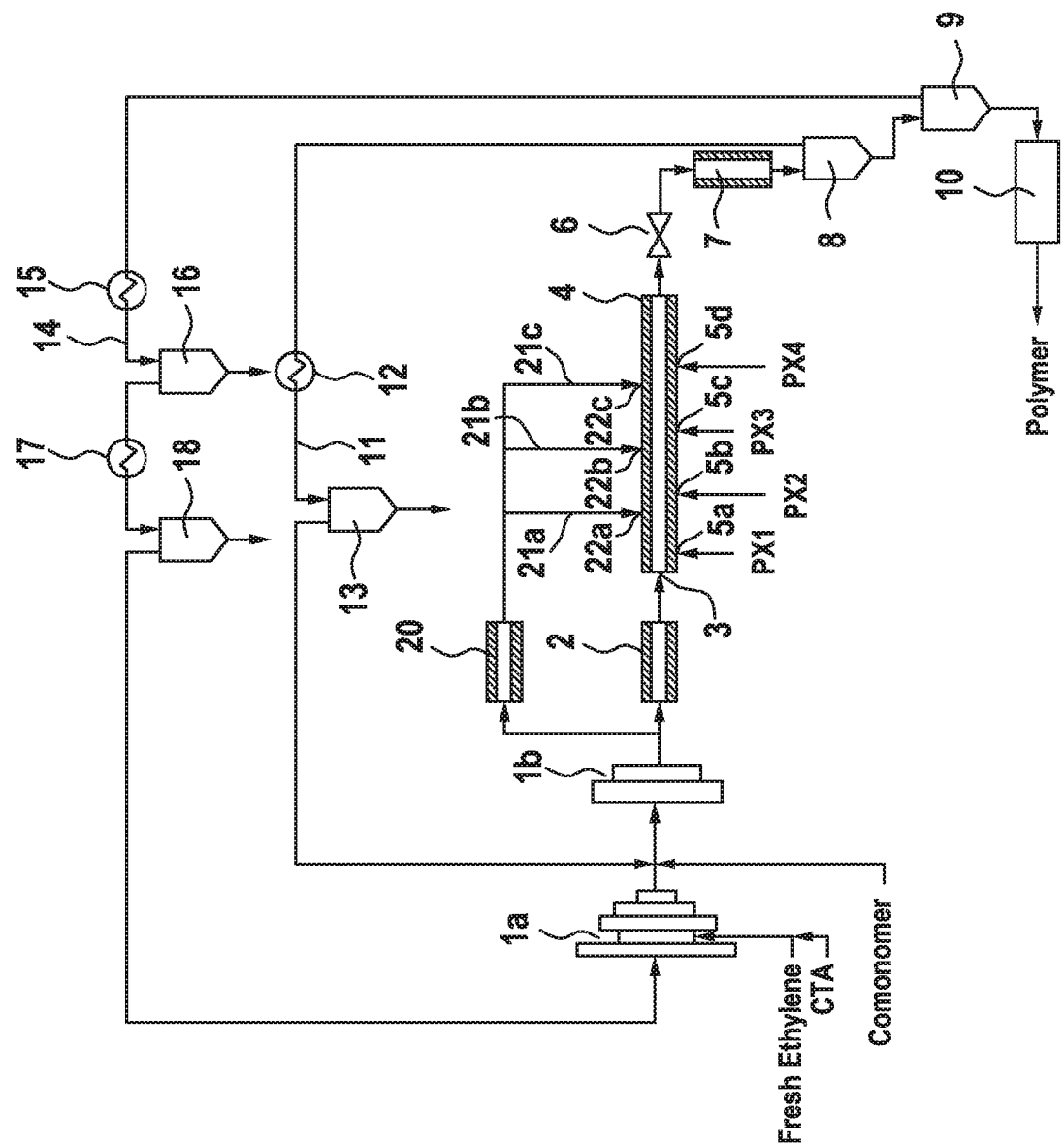
FIG. 2 shows schematically a set-up for a polymerization reactor in which a part of the reaction gas composition compressed by the secondary compressor is fed to the inlet of the tubular reactor and a part is fed as side streams to the tubular reactor downstream of the inlet of the tubular reactor.

FIG. 2 shows schematically a set-up for a polymerization reactor in which a part of the reaction gas composition compressed by the secondary compressor is fed to the inlet of the tubular reactor and a part is fed as side stream to the tubular reactor downstream of the inlet of the tubular reactor without however restricting the invention to the embodiments described therein.

The set-up shown in FIG. 2 is a modification of the set-up shown in FIG. 1 in which a part of the reaction mixture leaving the primary compressor (1b) is not fed to pre-heater (2) but is branched off and conveyed to a further heat-exchanger (20). In the configuration shown in FIG. 2, the reaction mixture passing the heat-exchanger (20) is divided in 3 partial streams which are fed via lines (21a), (21b) and (21c) as side streams into the tubular reactor (4) at side stream injection points (22a), (22b) and (22c), which are located a short distance upstream of initiator injection points (5b), (5c) and (5d). In some embodiments, the side streams fed via lines (21a), (21b) and (21c) into tubular reactor (4) are utilized to cool the reaction mixture within the tubular reactor (4). Accordingly, heat-exchanger (20) normally operates as a cooler and cools the reaction mixture leaving heat-exchanger (20) to a temperature in a range from 20° C. to 60° C.

Different configurations for a tubular polymerization reactor in accordance with the present technology are possible, including the use oxygen or air as an initiator instead of peroxidic initiators. For such polymerizations, oxygen or air may be added to the reaction gas composition in the primary compressor.

The polymers obtained by the process according to the present disclosure are, in some embodiments, ethylene homopolymers or copolymers having a good balance of mechanical and optical properties for use in thin films.

In certain embodiments, the polymers obtained by the process of the present disclosure may be converted to shaped articles such as films, laminating films or sheets, fibers, cables or wires or molded parts. Appropriate methods for the preparation of the shaped articles include extrusion molding, extrusion coating, blow molding, rotomolding and/or injection molding. The polymers of the present technology are suitable for producing films, e.g. on blown film machines or cast film lines. Such films can be produced with good operability and a good balance of optical and mechanical properties. The present disclosure also describes processes for preparing shaped articles from the obtained polymers and processes in which the shaped article is a film.

By carrying out the high-pressure polymerization in a tubular reactor which has a specific ratio $RD_{sp}$ of from 0.0050 $MPa^{-1}$ to 0.0069 $MPa^{-1}$ and a relatively small wall thickness, and a smooth inner surface of a surface roughness Ra of 2 µm or less, it is, when operating in a tubular reactor of a suitable specific reactor surface area $A_{sp}$ of 2 $m^2/(t/h)$ to 5.5 $m^2/(t/h)$, not only possible to prepare ethylene polymers with a high conversion rate but the process is suitable for preparing LDPE film grades of good operability and a good balance of optical and mechanical properties with a high conversion rate.

EXAMPLES

The roughness Ra of the inner surface of the reactor tubes was determined according to DIN EN ISO 4287:2010.

The tensile strength Rm of the steel for constructing the tubular reactor was determined according to EN ISO 6892-1:2009.

The 0.2% tensile yield strength at 320° C. of the steel used for constructing the tubular reactor was determined according to EN ISO 6892-2:2011.

Density was determined according to DIN EN ISO 1183-1:2004, Method A (Immersion) with compression molded plaques of 2 mm thickness. The compression molded plaques were prepared with a defined thermal history: pressed at 180° C., 20 MPa for 8 min with crystallization in boiling water for 30 min.

The melt flow rate (MFR) was determined according to DIN EN ISO 1133:2005, condition D at a temperature of 190° C. under a load of 2.16 kg.

Haze was determined according to ASTM D 1003-00 using 50 µm thickness blown film extruded at a melt temperature of 180° C. and a blow-up ratio of 2:1.

Gloss was determined at 60° C. according to ASTM D 2457-03 using 50 µm thickness blown film extruded at a melt temperature of 180° C. and a blow-up ratio of 2:1.

The gel count was determined by preparing a cast film, analyzing the film defects by means of an optical scanning device and classifying and counting the film defects according to their size (circle diameter). The films were prepared by an extruder (type ME20) equipped with a chill roll and winder, model CR-9, and analyzed by an optical film surface analyzer with flash camera system, model FTA100 (all components produced by OCS Optical Control Systems GmbH, Witten, Germany). The apparatus had the following characteristics:

screw diameter: 20 mm;
screw length: 25 D;
compression ratio: 3:1;
screw layout 25 D: 10 D feeding, 3 D compression, 12 D metering;
dimensions: 1360×650×1778 $mm^3$ (L×W×H; without die);
die width (slit die): 150 mm;
resolution: 26 µm×26 µm;

and was operated under the following conditions
T 1: 230° C.;
T 2: 230° C.;
T 3: 230° C.;
T 4: (adapter) 230° C.;
T 5: (die) 230° C.;
die slit die: 150 mm;
take off speed: 3.0 m/min;
screw speed: to be adjusted to film thickness (50 µm);
throughput: 1.0 to 1.5 kg/h (target 1.15 kg/h);
air shower on: −5 $m^3/h$,
chill roll temperature: 50° C.;
vab chill roll: 4 N;
winding tensile force: 4 N;
draw off strength: 5 N;
camera threshold 1: 75%-threshold 2: 65%.

For starting the measurement, the extruder and take off unit were set to the specified conditions and started with a material having a known gel level. The film inspection software was started when the extruder showed steady conditions of temperature and melt pressure. After having operated the extruder with the starting material for at least half an hour or after the gel count having reached the known gel level, the first sample to measure was fed to the extruder. After having reached a stable gel level for 45 minutes, the counting process was started until the camera had inspected an area of at least 3 $m^2$ of film. Thereafter, the next sample was fed to the extruder and after having reached a stable gel count for 45 minutes the counting process for the next sample was started. The counting process was set for all samples in a way that the camera inspected an area of at least 3 $m^2$ of film and the number of measured defects per size-class was normalized to 1 $m^2$ of film.

The draw down thickness was determined by preparing a blown film with slowly increasing take-off speed until the film had broken. The film thickness at "break point" is reported as draw down thickness. The films were prepared by a film blowing line having the following characteristics:

- single screw extruder with grooved feed section: 50 mm×30D;
- barrier screw with mixing elements at the screw tip;
- spiral mandrel die: 120 mm×1 mm;
- extruder temperature: MFR 3-0.7: 180° C.;
- throughput: 35 kg/hr;
- film blow up ratio: 2.5;
- single lip cooling ring (suitable for blow up ratios from 2:1 to 4:1);
- no internal bubble cooling system;
- height adjustable calibrating basket with Teflon® rolls;
- lay flat unit equipped with rolls (CFRP guide rolls, V-shape side positioning guidance by CFRP rolls; CFRP=Carbon Fiber Reinforced Plastic).

For determining the draw down thickness, the film preparation was started with a take-off speed of 3 m/min. Without changing processing conditions such as frost line, blow up ratio, and film width, the take-off speed was increased by a rate of 2 m/min every 20 seconds until the film broke or showed the formation of holes. The draw down thickness was measured at a distance of 70 cm prior to the location of the film break or hole formation. Measurements were made circumferentially in distances of 3 to 4 cm and the average of these measurements was reported as the draw down thickness.

Example 1

A LDPE film grade was produced by continuous polymerization of ethylene as ethylenically unsaturated monomer in a high-pressure tubular reactor of the design shown in FIG. 1. The reactor had a total length of 2140 m and a design pressure of 300 MPa. The tubular reactor was composed of reactor tubes having a length of 17 m and an inner surface roughness of Ra=0.1 μm. The steel of the tubes had a tensile strength $R_m$ of 1210 N/mm$^2$ and a 0.2% tensile yield strength at 320° C. of 920 N/mm$^2$, the tubular reactor had an outer diameter $d_o$ of 137 mm and an inner diameter $d_i$ of 75 mm, resulting in a specific ratio $RD_{sp}$ of 0.0061 MPa$^{-1}$. The peroxidic polymerization initiators were metered into the tubular reactor at four positions using isododecane as additional diluent. Propionaldehyde was added as a chain transfer agent to the fresh ethylene stream entering the primary compressor (1a) in an amount of 1.4 kg per ton (t) of produced polyethylene. The secondary compressor (1b) was operated with a throughput of 125 t reaction gas composition per hour. Accordingly, the polymerization was carried out with a specific reactor surface area of 4.03 m$^2$/(t/h).

The compressed reaction gas composition was heated to 160° C. in pre-heater (2) and fed to the inlet of the tubular reactor having a pressure of 260 MPa. For removing the generated heat of polymerization, cooling water was circulated through the cooling jackets attached to the outer surface of the reactor tubes (not shown in FIG. 1). The reaction mixture discharged from the tubular reactor (4) was passed through a post reactor cooler (7) and separated from volatiles in two steps via a first separation vessel (8) and a second separation vessel (9). The degassed liquid polymer was conveyed to an extruder and granulator (10) to form LDPE pellets. Within a period of 24 hours of continuous production, 975 t of LDPE were obtained having the properties summarized in Table 1. Accordingly, the conversion rate of ethylene per pass through the reactor was 32.5%.

Comparative Example A

A film grade LDPE of the same density and melt flow rate as the film grade LDPE prepared in Example 1 was produced by continuous polymerization of ethylene as ethylenically unsaturated monomer in a high-pressure tubular reactor of the design shown in FIG. 1 having in total a length of 1125 m and a design pressure of 340 MPa. The tubular reactor was composed of reactor tubes having a length of 10 m and an inner surface roughness of Ra=3.8 μm. The steel of the tubes had a tensile strength $R_m$ of 990 N/mm$^2$ and a 0.2% tensile yield strength at 320° C. of 720 N/mm$^2$, allowing to construct the tubular with an outer diameter $d_o$ of 96 mm and an inner diameter $d_i$ of 40 mm, thus resulting in a specific ratio $RD_{sp}$ of 0.0071 MPa$^{-1}$. The peroxidic polymerization initiators were metered into the tubular reactor at four positions using isododecane as additional diluent. Propionaldehyde was added as a chain transfer agent to the fresh ethylene stream entering the primary compressor (1a) in an amount of 1.4 kg per t of produced polyethylene. The secondary compressor (1b) was operated with a throughput of 32 t reaction gas composition per hour. Accordingly, the polymerization was carried out with a specific reactor surface area of 4.42 m$^2$/(t/h).

The polymerizations were carried out as described in Example 1. Within a period of 24 hours of continuous production, 240 t of LDPE were obtained having the properties summarized in Table 1. Accordingly, the conversion rate of ethylene per pass through the reactor was 31.3%.

Comparative Example B

The polymerization of Comparative Example A was repeated except that a mixture of propionaldehyde and propene in a weight ratio of 1:10 was added as a chain transfer agent to the fresh ethylene stream entering the primary compressor (1a) in a total amount of 8 kg per t of produced polyethylene. Within a period of 24 hours of continuous production, 210 t of LDPE were obtained having the properties summarized in Table 1. Accordingly, the conversion rate of ethylene per pass through the reactor was 27.3%.

TABLE 1

| | Example 1 | Comparative Example A | Comparative. Example B |
|---|---|---|---|
| Density [g/cm$^3$] | 0.9232 | 0.9231 | 0.9230 |
| MFR$_{2.16}$ [g/10 min] | 0.75 | 0.76 | 0.75 |
| Haze [%] | 6.5 | 8.3 | 6.7 |
| Gloss | 97 | 69 | 96 |
| Draw down thickness [μm] | 17 | 30 | 18 |
| Gel count | | | |
| <200 μm [1/100 m$^2$] | 365 | 542 | 340 |
| 200-400 μm [1/100 m$^2$] | 75 | 119 | 77 |
| 400-800 μm [1/100 m$^2$] | 6 | 11 | 7 |

The comparison of Example 1 and Comparative Examples A and B demonstrates that by reducing the specific ratio $RD_{sp}$ of the tubular reactor in combination with reducing the roughness of the inner surface it is possible to prepare LDPE with a higher conversion of ethylene per pass of the reactor without losses in the polymer properties, while the comparison of Comparative Examples A and B shows that conversion rate per pass of the reactor and polymer properties cannot be varied independently for a LDPE grade of defined density and melt flow rate.

What is claimed is:

1. A tubular reactor for polymerizing or copolymerizing ethylenically unsaturated monomers, comprising:
 a length ranging from 0.5-5 km, an inner diameter $d_i$ ranging from 50-120 mm, and a length-to-diameter ratio ranging from 1000-50000;
 a specific reactor surface area $A_{sp}$ ranging from 2-5.5 $m^2/(t/h)$, the specific reactor surface area $A_{sp}$ being a ratio of an area of the inner surface of the tubular reactor to a feed rate of reaction gas composition to the tubular reactor ranging from 100-210 t/h; and
 an inlet and at least two spatially separated initiator injection points downstream of the inlet.

2. The tubular reactor of claim 1, wherein the specific reactor surface area $A_{sp}$ ranges from 3-5 $m^2/(t/h)$.

3. The tubular reactor of claim 1, wherein the specific reactor surface area $A_{sp}$ ranges from 3.5-4.5 $m^2/(t/h)$.

4. The tubular reactor of claim 1, wherein the feed rate for calculating the specific reactor surface area $A_{sp}$ is the combination of feed rates of reaction gas fed to the inlet and the at least two spatially separated initiator injection points.

5. The tubular reactor of claim 1, further comprising a pipe having a specific ratio $RD_{sp}$ of 0.0050-0.0069 $MPa^{-1}$, where $RD_{sp}$ is the ratio of the outer diameter $d_o$ to the inner diameter $d_i$ divided by a design pressure $p_{des}$ according to the equation:

$$RD_{sp} = \frac{d_o}{d_i * p_{des}}.$$

6. The tubular reactor of claim 5, wherein the design pressure $p_{des}$ of the tubular reactor ranges from 240-400 MPa.

7. The tubular reactor of claim 5, wherein the pipe has a ratio of an outer diameter $d_o$ to the inner diameter $d_i$ ranging from 1.2-2.76.

8. The tubular reactor of claim 7, wherein the pipe has an inner surface which has a surface roughness Ra of 2 μm or less, determined according to DIN EN ISO 4287:2010.

9. The tubular reactor of claim 1, wherein the feed rate of the reaction gas composition to the tubular reactor ranges from 120-160 t/h.

10. The tubular reactor of claim 1, comprising a specific reactor surface area $A_{sp}$ ranging from 2-5.5 $m^2/(t/h)$, the specific reactor surface area $A_{sp}$ being a ratio of an area of the inner surface of the tubular reactor to a feed rate of reaction gas composition to the tubular reactor ranging from 100-180 t/h.

11. The tubular reactor of claim 5, wherein the pipe has a tensile strength $R_m$ of at least 1100 $N/mm^2$ as determined according to EN ISO 6892-1:2009.

12. The tubular reactor of claim 5, wherein an outer diameter $d_o$ is essentially constant over the length of the pipe and the inner diameter $d_i$ of the pipe is essentially constant over the length of the pipe.

13. The tubular reactor of claim 5, wherein an outer diameter $d_o$ of the pipe, the inner diameter $d_i$ of the pipe, or both of the outer diameter $d_o$ and the inner diameter $d_i$ varies over the length of the pipe.

14. A process for polymerizing or copolymerizing ethylenically unsaturated monomers, comprising:
 feeding a reaction gas into a tubular reactor having a specific reactor surface area $A_{sp}$ of 2-5.5 $m^2/(t/h)$, the specific reactor surface area $A_{sp}$ being a ratio of an area of the inner surface of the tubular reactor to a feed rate of reaction gas composition to the tubular reactor, wherein the tubular reactor has a specific ratio $RD_{sp}$ ranging from 0.0050-0.0069 $MPa^{-1}$, where $RD_{sp}$ is the ratio of the outer diameter $d_o$ to the inner diameter $d_i$ divided by the design $p_{des}$ according to the equation;

$$RD_{sp} = \frac{d_o}{d_i * p_{des}}$$

feeding an initiator into the tubular reactor at a concentration of 0.1-50 mol/t; and
 polymerizing the reaction gas in the tubular reactor at a temperature of 100-350° C. and a pressure of 180-340 MPa.

15. The process of claim 14, wherein the specific reactor surface area $A_{sp}$ is 3-5 $m^2/(t/h)$.

16. The process of claim 14, wherein the specific reactor surface area $A_{sp}$ is 3.5-4.5 $m^2/(t/h)$.

17. The process of claim 14, further comprising:
 feeding a 30-90% by weight portion of the reaction gas to an inlet of the tubular reactor; and
 feeding a 10-70% by weight portion of the reaction gas to one or more side streams of the tubular reactor downstream of the inlet of the tubular reactor.

18. The process of claim 17, wherein the tubular reactor has an inner surface which has a surface roughness Ra of 2 μm or less, determined according to DIN EN ISO 4287:2010.

* * * * *

UNITED STATES PATENT AND TRADEMARK OFFICE
CERTIFICATE OF CORRECTION

PATENT NO. : 9,758,603 B2
APPLICATION NO. : 15/461064
DATED : September 12, 2017
INVENTOR(S) : Dieter Littmann et al.

Page 1 of 1

It is certified that error appears in the above-identified patent and that said Letters Patent is hereby corrected as shown below:

In the Specification

| | | |
|---|---|---|
| Column 3 | Line 7 | After "equation", insert --:-- |
| Column 7 | Line 43 | After "equation", insert --:-- |
| Column 11 | Line 6 | Delete "(1b)" and insert --(1a)-- |
| Column 11 | Line 60 | Delete "Rm" and insert --$R_m$-- |
| Column 14 | Line 49 | In Table 1, delete "Comparative." and insert --Comparative-- |

In the Claims

| | | |
|---|---|---|
| Column 16 | Line 24 | In Claim 14, after "design", insert --pressure-- |
| Column 16 | Line 24 | In Claim 14, delete "equation;" and insert --equation:-- |
| Column 16 | Line 27 | In Claim 14, delete " $RD_{sp} = \dfrac{d_o}{d_i * p_{des}}$ " and insert -- $RD_{sp} = \dfrac{d_o}{d_i * p_{des}},$ -- |

Signed and Sealed this
Twenty-fifth Day of February, 2020

Andrei Iancu
*Director of the United States Patent and Trademark Office*